United States Patent [19]

van der Lely

[11] Patent Number: 4,505,353
[45] Date of Patent: Mar. 19, 1985

[54] ARTICULATED TRACTOR WITH TWO ENGINES IN TANDEM

[76] Inventor: Cornelis van der Lely, 7 Brüschenrain, Zug, Switzerland

[21] Appl. No.: 4,565

[22] Filed: Jan. 18, 1979

Related U.S. Application Data

[62] Division of Ser. No. 733,373, Oct. 18, 1976, Pat. No. 4,173,352.

[30] Foreign Application Priority Data

Oct. 16, 1975 [NL] Netherlands .......................... 7512128

[51] Int. Cl.³ .......................... B60K 5/08; B62D 53/02
[52] U.S. Cl. .................................. 180/235; 180/69.6; 180/901
[58] Field of Search ................... 180/235, 54 C, 54 D, 180/69.6, 901

[56] References Cited

FOREIGN PATENT DOCUMENTS 840263 7/1960 United Kingdom ................ 180/235
909705 10/1962 United Kingdom ................ 180/235

Primary Examiner—John A. Pekar
Attorney, Agent, or Firm—Penrose Lucas Albright

[57] ABSTRACT

Two tractor units, each having a single axle with a plurality of wheels on the axle, are connected in tandem whereby they are pivotable relative to each other about a horizontal axis extending in the direction of normal travel of the tractor and a vertical axis, each unit including an engine which extends in front of its axle and is drivingly connected to its respective axle, the two engines being aligned. A cabin and controls for an operator are disposed in the rear unit and a coupling member for receiving agricultural implements extends to the rear of the rear unit. The forward unit has large heavy fuel tanks extending across its width which, even when empty, cause the center of gravity of the forward unit to be to the rear of the axle of the forward unit. The widths and lengths of the two units and the distance between the axles of the two units are all dimensionally about the same. The frame of the forward unit forward of the axle and the drive shafts of both engines are inclined upwardly in a forward direction at about 10° relative to the horizontal. Each axle in the first embodiment has six wheels and the further embodiment four wheels. The disposition of the engines and the fuel tanks being such that an operator in the cabin on the rear unit has a relatively clear view to the front and rear of the front wheels, to the front and rear of the rear wheels and of the coupling device for agricultural implements and any implements coupled thereto at the rear of the tractor.

7 Claims, 11 Drawing Figures

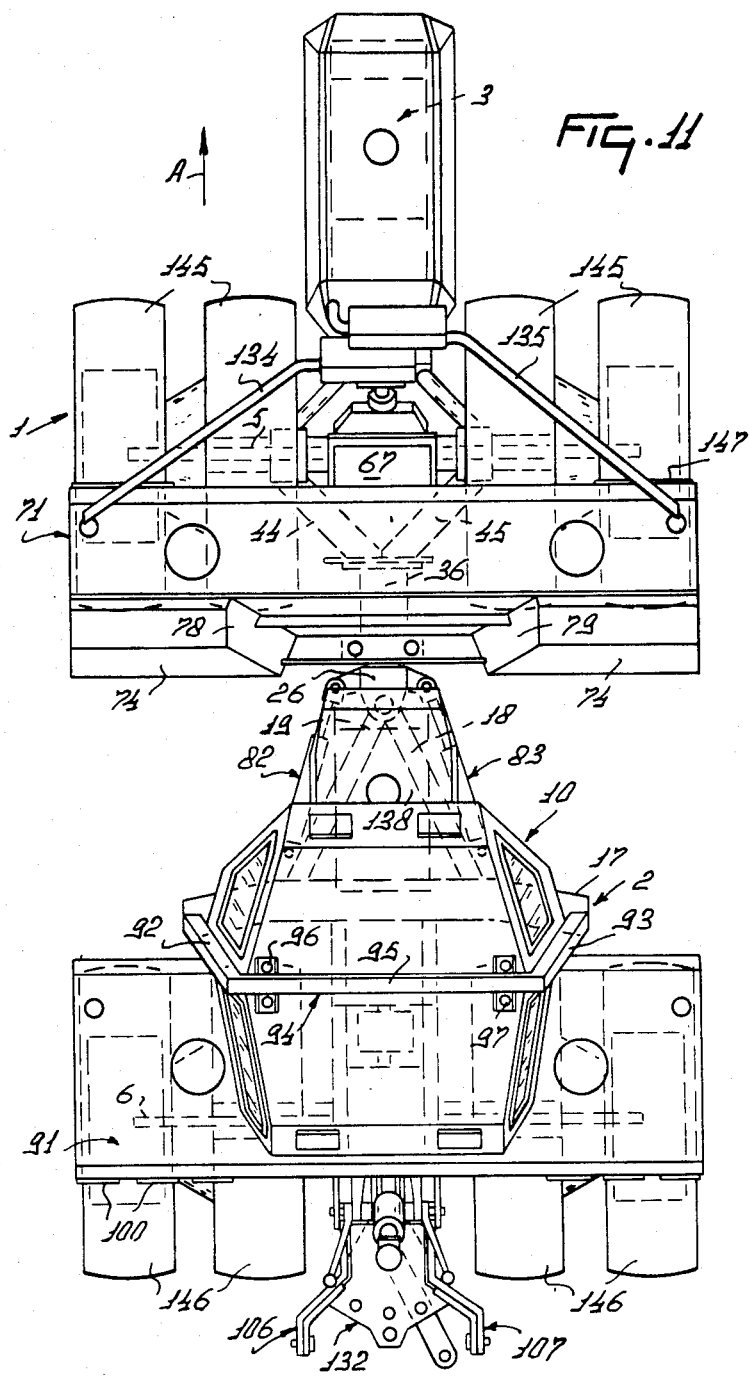

ARTICULATED TRACTOR WITH TWO ENGINES IN TANDEM

RELATED APPLICATIONS

This is a division of application Ser. No. 733,373 filed Oct. 18, 1976, now U.S. Pat. No. 4,173,352.

SUMMARY OF THE INVENTION

The invention relates to a tractor, particularly a high horsepower agricultural tractor having a large fuel capacity which is designed to work large fields at comparatively long distances from fueling stations and repair facilities.

There is a limit as to the efficiency of tractors used for agricultural purposes which is imposed by the size and weight of the tractors and the terrain and operations to be performed by them. An agricultural field is not a highway and it is important for a number of reasons that the weight borne by each of the wheels be roughly the same for the various operations which the tractor must undertake. Because of this for tractors of the type involved in the instant invention, it is advantageous that they be articulated and designed so that, with tractors having two axles and two wheel sets per axle, each axle conforms more or less to the inclination of the underlying ground whereby the wheels maintain, within reasonable limits, the same proportion of the overall weight of the tractor. Also with large tractors, the importance of the operator seeing the ground in front and to the rear of each set of tires as well as the agricultural equipment which is carried by the tractor becomes of increasing importance. A primary object of the instant invention is the provision of a tractor of the type described having a configuration and distribution of components whereby it operates advantageously and permits an operator of the tractor to have good vision of those areas of the ground, tractor and equipment operated by the tractor which are important to effective operations.

For a better understanding of the invention and to show how the same may be carried into effect, reference will be made by way of example to the accompanying drawing.

BRIEF DESCRIPTION OF THE DRAWINGS

FIG. 11 is a plan view of a second embodiment of a tractor in accordance with the principle of the invention.

DESCRIPTION OF PREFERRED EMBODIMENTS

Figure 1:
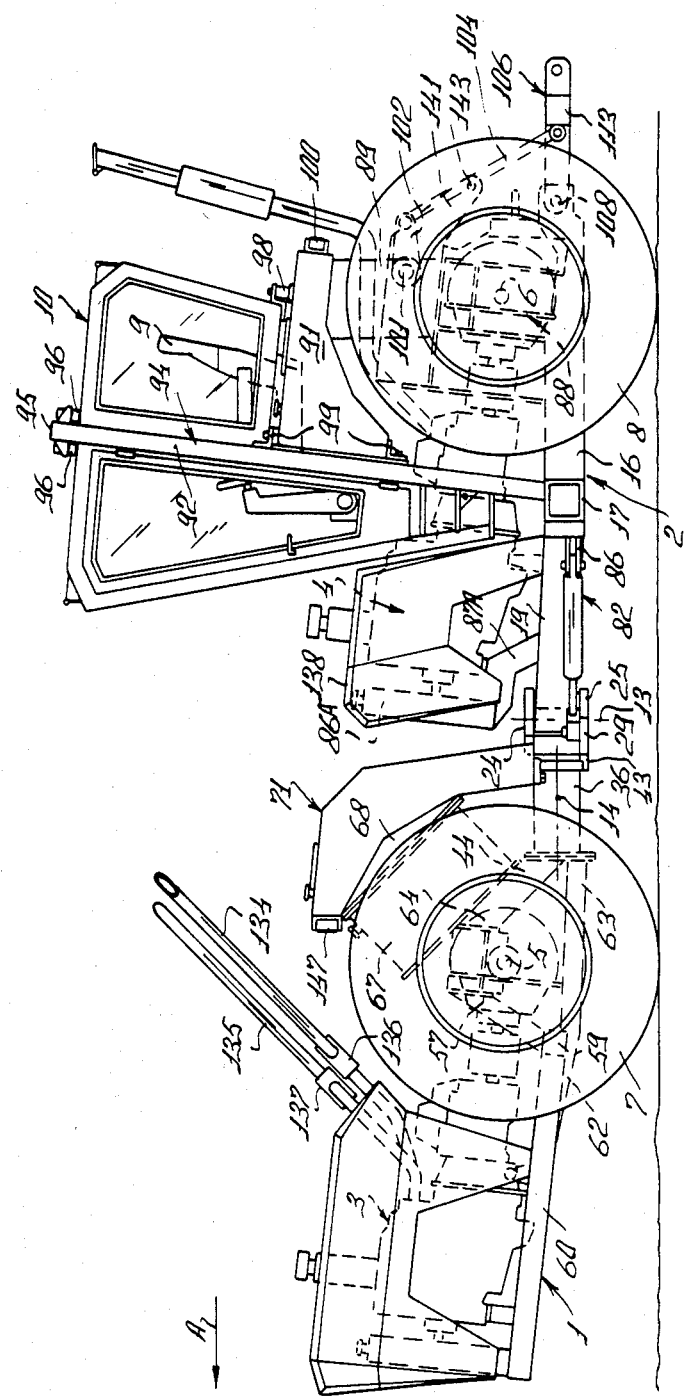
FIG. 1 is a horizontal side elevation of the tractor in accordance with the invention.

The tractor according to the invention comprises a frame having a forward frame portion 1 and a rear frame portion 2, which frame portions are adapted to turn relatively to one another in a manner to be described more fully hereinafter. Viewed in the direction of travel A, the frame portion 1 is supported on the ground by a forward wheel axle 5, whereas the frame portion 2 is supported by a rear wheel axle 6. Axle 5 is provided with six front wheels, three of which are located on one side of the vertical longitudinal plane of the tractor's symmetry and three on the other side. Axle 6 also has six rear wheels 8, three of which are located on one side of the longitudinal, vertical plane of symmetry and three on the other side. Viewed in side elevation, a driver seat 9 is arranged above the foremost part of wheels 8 in a driver cabin 10 partly arranged in front of wheels 8.

Two driving engines 3 and 4 for the tractor are arranged one behind the other, viewed in the direction of travel A and are located, at least in this embodiment, one directly behind the other in the direction of travel. Alternatively they may be arranged in relatively shifted positions. Engines 3 and 4, preferably Diesel, each about two hundred HP, comprising a cooler, associated hydraulic or mechanical clutches and associated hydraulic or mechanical torque converters (gear boxes) and differential gears, constitute two independently operable engine units secured to frame portion 1 and frame portion 2 respectively. Engine 3 drives wheels 7, whereas engine 4 drives wheels 8. Engine 3 is located on the front side of axle 5, the rear of engine 3 as seen in FIG. 1 being spaced from axle 5 by a distance approximately equal to the length of engine 3, measured in the direction of travel A. Viewed in the direction of travel A, engine 4 is also located in front of axle 6, the rear of engine 4 being spaced at a distance in front of said axle approximately equal to the length of engine 4, measured in the direction of travel A.

Figure 2:
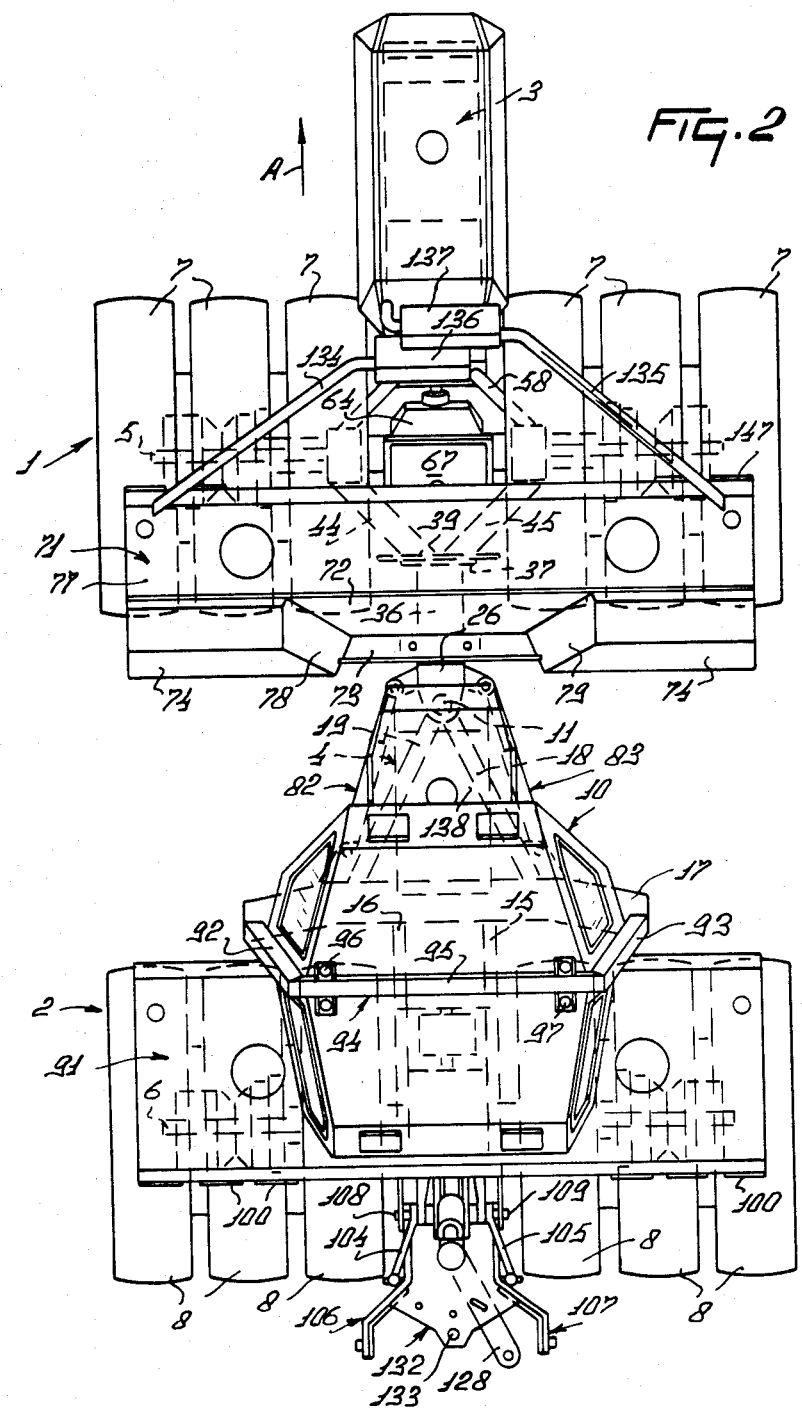
FIG. 2 is a plan view of the tractor of FIG. 1.
Figure 4:
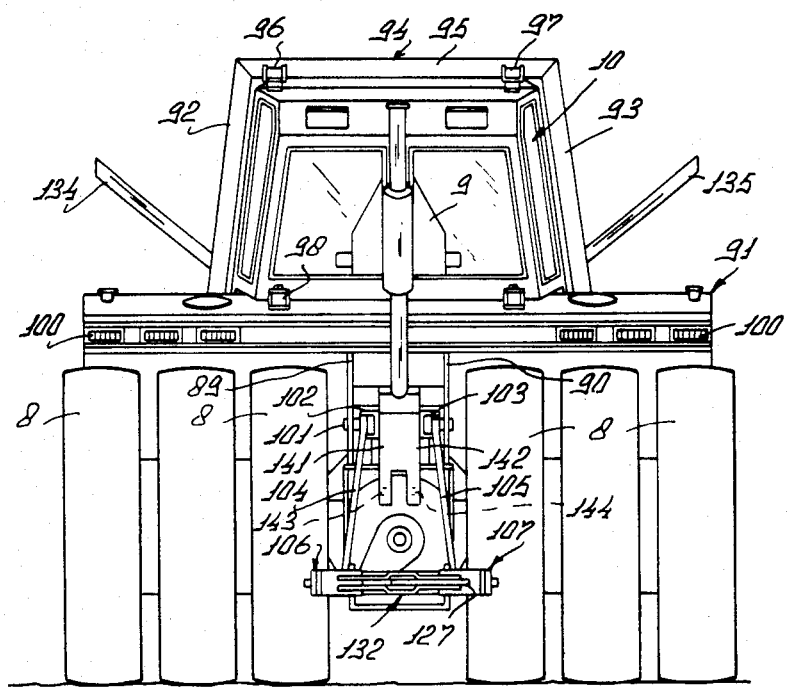
FIG. 4 is a rear view of the tractor shown in FIG. 1.
Figure 3:
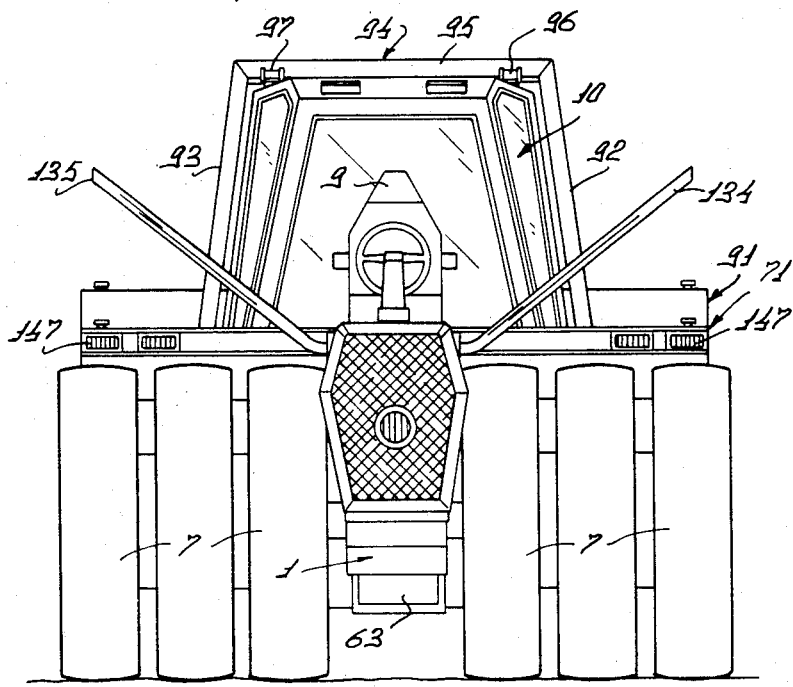
FIG. 3 is a front view of the tractor shown in FIG. 1.
Figure 5:
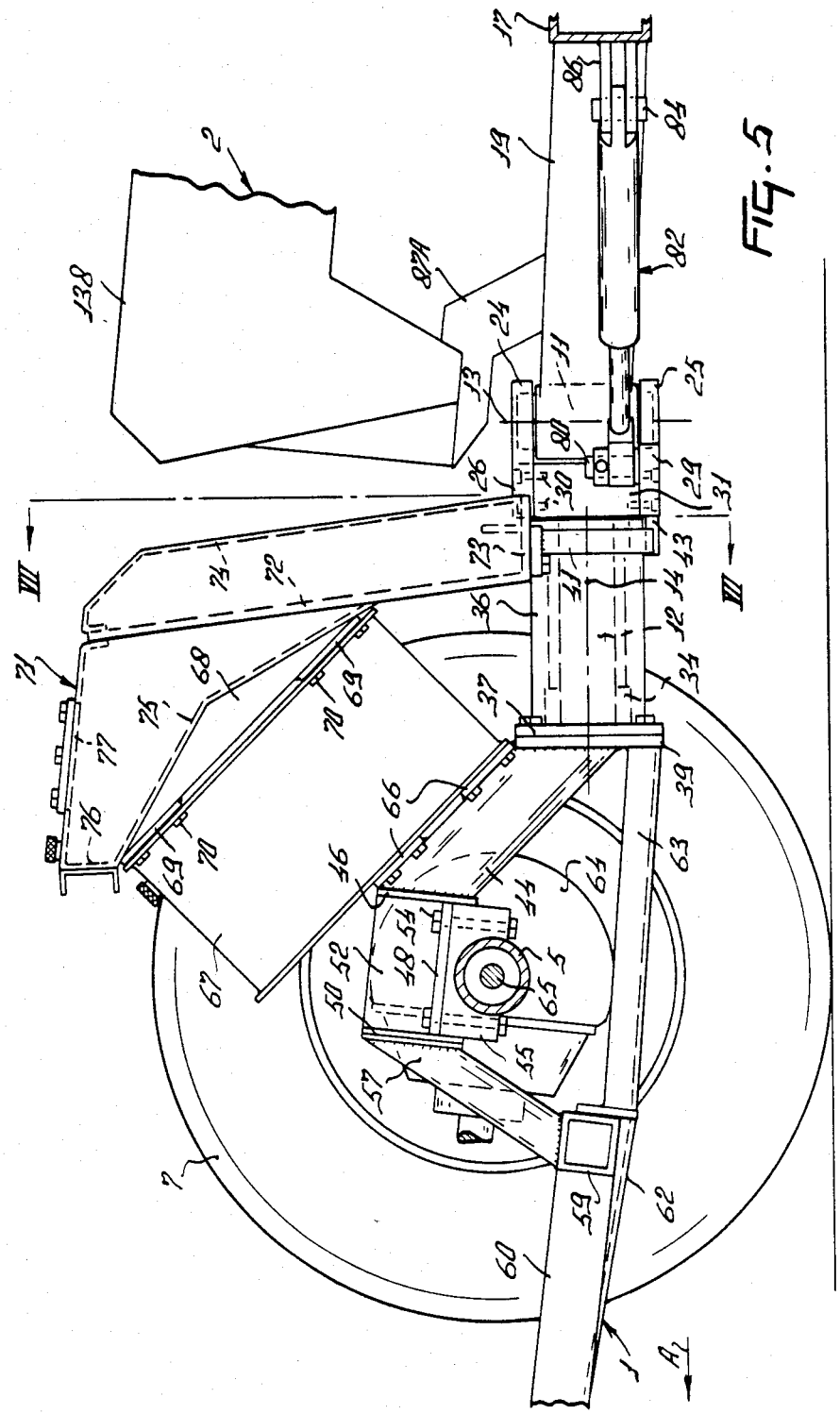
FIG. 5 is a horizontal side elevation of the central part of the tractor, part of the front wheels and part of the foremost engine unit being omitted.
Figure 6:
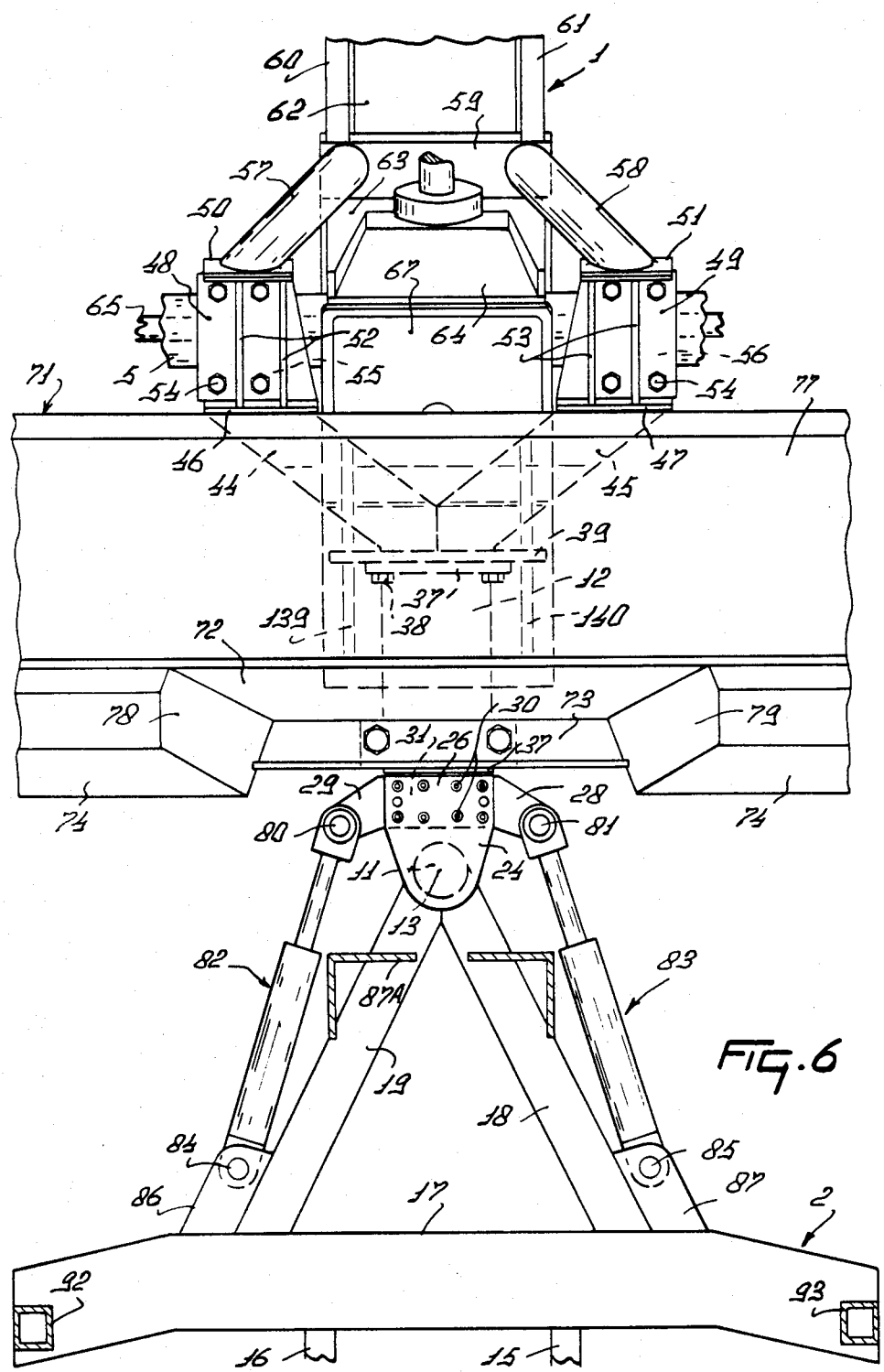
FIG. 6 is a plan view of the part shown in FIG. 5.
Figure 7:
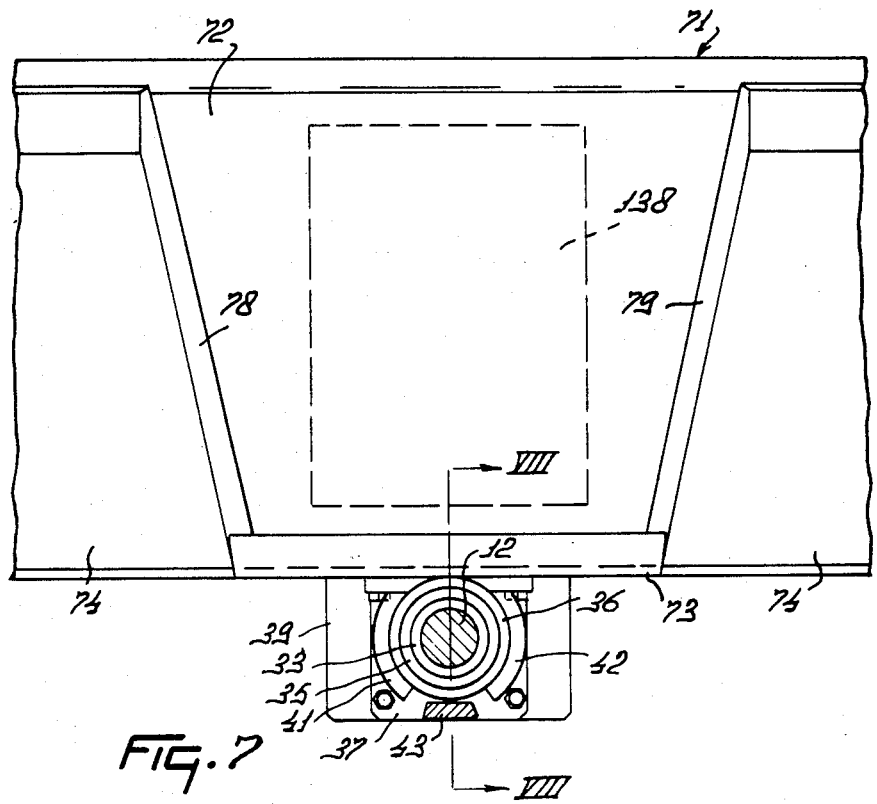
FIG. 7 is a sectional view taken on the lines VII—VII in FIG. 5.
Figure 8:
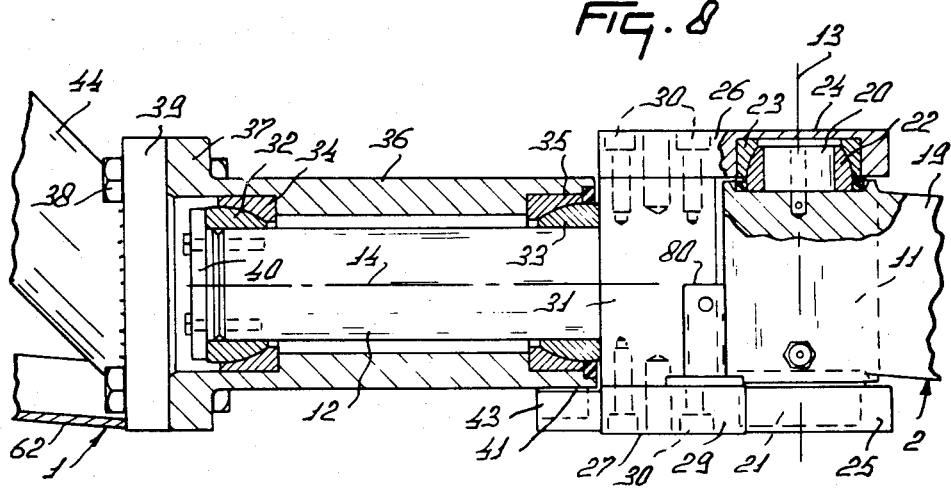
FIG. 8 is partly a sectional view and partly an elevational view taken on the lines VIII—VIII in FIG. 7.
Figure 9:
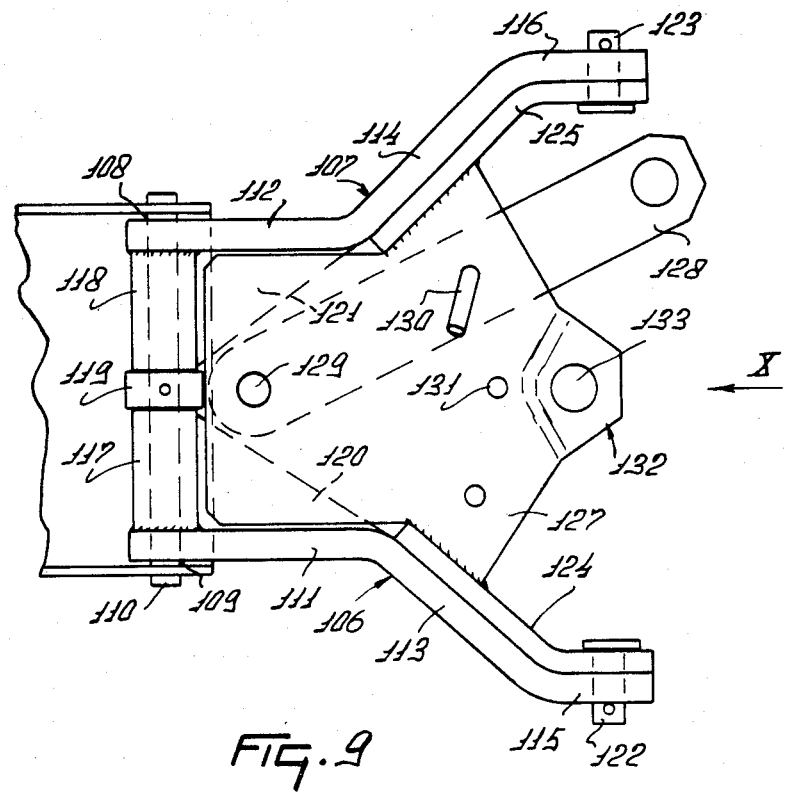
FIG. 9 is a plan view of part of the lifting device of the tractor.
Figure 10:
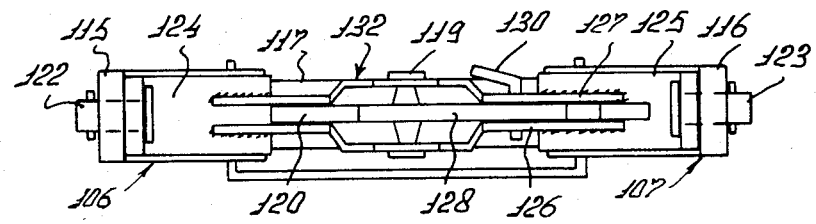
FIG. 10 is an elevational view taken in the direction of the arrow X in FIG. 9.

The tractor comprises two consecutive, interconnected units, the forward unit including engine 3, frame portion 1 and axle 5 with wheels 7, whereas the rear unit includes engine 4, frame portion 2 and axle 6 with wheels 8. As seen in FIG. 2, the widths and lengths of the units are approximately the same. These units are coupled by two pivotal shafts located between axles 5 and 6. A first pivotal shaft includes a vertical shaft 11 having a center line 13, located behind a second pivotal shaft, viewed in the direction of travel A, the latter comprising a horizontal shaft 12, with center line 14 located in the vertical plane of symmetry of the forward unit. Vertical center line 13 may be located in the longitudinal, vertical plane of symmetry of the forward unit and is always located in the vertical plane of symmetry of the rear unit. The vertical pivotal shaft including shaft 11 is part of the pivotal control of the tractor. Axle 5 is not pivotable with respect to frame portion 1 and axle 6 is not pivotable with respect to the frame portion 2.

Frame portion 2 comprises two approximately horizontal supports 15 and 16 extending parallel to the longitudinal, vertical plane of symmetry of the rear unit. Supports 15 and 16, which hold inter alia part of a lifting device, as will be set out more fully hereinafter, are disposed one on each side of said longitudinal, vertical plane of symmetry at a distance from same. Supports 15 and 16 are partly located between a pair of wheels 8 and rigidly secured at their front to a horizontal, hollow frame beam 17, extending transversely of the direction of travel. The length of frame beam 17 is approximately equal to the distance between the vertical planes of symmetry of the two penultimate outermost wheels 8 and also substantially equal to the length of tractor located behind the frame beam 17, measured in the direction of travel A. The front of frame beam 17 is provided with two supports 18 and 19 having fastening points on beam 17 which are located at a distance from the longitudinal, vertical plane of symmetry of the rear unit. Two supports 18 and 19, disposed symmetrically to the vertical plane of symmetry of rear unit, converge forwardly away from the beam 17, are fastened to one another in front of beam 17, and locally hold shaft 11 of the vertical pivotal shaft.

Shaft 11 is a comparatively heavy, solid shaft provided on the top and bottom sides with stub shafts 20 and 21, the center lines of which coincide with center line 13 of shaft 11. Stub shafts 20 and 21 are surrounded by bearing shells 22. Bearing shells 22 co-operate with bearing shells 23 fastened in ears 24 and 25 respectively, which are integral with an upper cover plate 26 and a lower cover plate 27 respectively. Lower cover plate 27 is furthermore provided with laterally and rearwardly inclined ears 28 and 29 disposed specularly to the longitudinal, vertical plane of symmetry of the forward tractor unit. Ears 28 and 29 together with cover plate 27 and ear 25 form a single, solid assembly. This assembly as well as the assembly of cover plate 26 and the ear 24 are essentially plate-shaped and disposed horizontally. Cover plates 26 and 27 are fastened by bolts 30 on either side of a solid steel block 31 substantially formed in the shape of a parallelepiped. Block 31 is furthermore integral with a cylindrical part extending forwardly away from block 31 and forming shaft 12. A horizontal plane containing center line 14 of shaft 12 constitutes a plane of symmetry of both block 31 and shaft 11. The length of shaft 12, measured in a horizontal direction along the center line 14, is at least twice the length of shaft 11, measured along center line 13. Near its two ends shaft 12 is provided bearing shells 32 and 33 locally surrounding the shaft and co-operating with bearing shells 34 and 35 respectively, fastened to a cylindrical supporting pipe or bearing part 36, the center line of which coincides with center line 14. Bearing shells 32 and 34 are fastened at a distance from bearing shells 33 and 35, which is at least twice the diameter of shaft 12. The end of part 36 facing block 31 is freely movable with respect to said block, whereas the end of part 36 remote from block 31 is rigidly secured with the aid of a flange 37 and bolts 38 to a supporting plate 39, which is located in front of shaft 12, a pressure plate 40 being arranged in the space between plate 39 and shaft 12 for pressing shell 32 against shell 34 held by part 36 and hence also shell 35 against shell 33.

Near block 31 the sides of the outer periphery of the part 36 are provided with two curved strips 41 and 42, the inner sides of which fit to the cylindrical periphery of part 36 and are arranged specularly to the longitudinal, vertical plane of symmetry of the forward tractor unit. The two lower ends of the strips are spaced apart through a selected circumferential angle, viewed from center line 14. The lower side of block 31 is provided with a stop or lug 43 projecting forwardly in the direction of flange 37 and located, with clearance in the space between the lower boundary surfaces of strips 41 and 42.

The foremost boundary surface of plate 39, viewed in the direction of travel A, is provided with two cylindrical pipes 44 and 45, which are inclined away from plate 39 forwardly, upwardly and laterally. Viewed on plan and in the direction of travel A the pipes diverge from plate 39 to the front. Viewed in side elevation the length of pipes 44 and 45 is at least equal to the length of part 36. Pipes 44 and 45 are fastened near the upper and foremost ends, spaced from one another viewed on plan, to upwardly extending supporting plates 46 and 47, respectively, each of which is rigidly secured to substantially horizontal mounting plates 48 and 49 respectively. At the front edges of mounting plates 48 and 49 remote from supporting plates 46 and 47, supporting plates 50 and 51 respectively are rigidly secured so as to extend upwardly and parallel to plates 46 and 47. Between the supporting plates 46 and 50 and the mounting plate 48 and in a similar manner between the supporting plates 47 and 51 and the associated mounting plate 49 a plurality of stiffening plates 52 and 53 extend substantially parallel to the longitudinal, vertical plane of symmetry of the forward unit. The lower sides of mounting plates 48 and 49 are provided by means of bolts 54 with pressure members 55 and 56 respectively having a semi-cylindrical cavity remote from plates 48 and 49, the center line of said cavity being horizontal and orthogonal to the longitudinal, vertical plane of symmetry of the foremost unit. In said cavity axle 5 is rigidly secured. From each of the two relatively spaced supporting plates 50 and 51, a pipes 57 and 58, respectively, are each inclined downwards and inwards to the front and rigidly secured in place, said two pipes converging towards the front, viewed in plan. Pipes 57 and 58 are specularly arranged to the longitudinal, vertical plane of symmetry of the foremost unit and, at the ends remote from supporting plates 50 and 51, they terminate in an approximately horizontal, forwardly and upwardly inclined plane and locally secured rigidly to a transverse beam 59 extending transversely of the longitudinal plane of symmetry of the foremost unit. Viewed in plan, the length of beam 59 is slightly smaller than the distance between the mounting plates 48 and 49. At the front surface of beam 59, two supports 60 and 61 are secured near the two ends of said beam, one on each side and at a distance from the longitudinal, vertical plane of symmetry of the foremost unit. Viewed in side elevation, the two parallel supports extend away from beam 59 upwardly at an angle of about 10°. To supports 60 and 61 is secured at least part of the engine unit including engine 3. On the lower side supports 60 and 61 are interconnected by a U-shaped protecting plate 62, while between transverse beam 59 and plate 39 a further protective plate 63 is provided to serve in addition for stiffening pipes 44, 45 and 57, 58 respectively, holding the forward axle 5. The forward unit is associated with a differential gear 64, integral with axle 5. Viewed in plan, differential 64 is located between mounting plates 48 and 49 and extends, viewed from the side as far as just above protective plate 63. Axle 5 includes a driving shaft 65, which can be driven via differential 64 by engine 3.

At the top of pipes 44 and 45, flanges 66 are extending parallel to a plane having a forwardly open angle of about 45° to a horizontal plane, intersecting the latter along a horizontal line at right angles to the longitudinal, vertical plane of symmetry of the forward tractor unit. Flanges 66 of the two pipes 44 and 45 have secured to them in an inclined position a tank 67 for fuel or hydraulic fluid. The boundary surface of tank 67 remote from pipes 44 and 45 is provided with at least two supporting plates 68 provided with flanges 69, which are secured by bolts 70 to the tank's boundary surface.

A fuel tank 71 carried by tank 67, plates 68 and pipes 68 comprises a a heavy girder or supporting plate 72 substantially shaped in the form of an L, The comparatively short limb of plate 72, constituting the tank's a lower boundary surface, is provided on the lower side with a pressure plate 73, through which plate 72 bears on and is secured to part 36 and the top sides of two strips 41 and 42, respectively. Viewed in the direction of travel A, a plate 74 is arranged at a distance behind plate 72 substantially parallel to its longer limb plate 74 also forming an outer boundary of tank 71 and being secured on the lower side to the shorter limb of plate 72. It extends forwardly on the top side where it is secured to plate 72 near the top edge thereof. At a distance above the corner of plate 72, the long limb of plate 72 has secured to it a wall plate 75 joining the equal sides of the two limbs of plate 68. The fastening area of plate 75 is located near the corner of tank 67 nearest plate 72. Wall plate 75, which also forms an outer wall of tank 71, terminates near the top corner of tank 67 and terminates at this place in a substantially vertical wall portion 76, which in again bent over and terminates in a substantially horizontal top plate 77 also forming the tank's outer wall, said top plate 77 joining the top edge of plate 72 near the upper line of connection between wall plate 74 and plate 72. Plate 72 is a general stiffening member of tank 71, which in this embodiment has a capacity of about two thousand liters of fuel and projects on either side over a considerable distance beyond portion 1 and tank 67 in a free-supporting manner. Tank 71 is carried to a considerable extent near the ends of plate 75, by tank 67, while weight of fluid contained between the plates 72, 75, 76 and 77 directly bears on tank 67 and hence on pipes 44 and 45.

Plates 72, 75, 76 and 77 extend in a direction at right angles to the longitudinal, vertical plane of symmetry of the foremost tractor unit, over a distance approximately equal to the overall width of the tractor or, in other words the width determined by wheels 7. The space enclosed by the last-mentioned plates is closed near the two ends near the outermost front wheels by approximately vertical walls. Tank spaces formed by girder plate 72 and plate 74 on either side of and at a distance from the longitudinal, vertical plane of symmetry of the foremost tractor unit are bounded on the sides facing said plane of symmetry by partitions 78 and 79 forming further boundary walls of tank 71. Partitions 78 and 79 are in specular positions relative to the longitudinal plane of symmetry and are inclined outwardly from bottom to top.

The outer ends of ears 28 and 29 have secured to them vertical pivotal shafts 80 and 81, to which are fastened the ends of piston rods of hydraulic cylinders 82 and 83. Cylinders 82 and 83 per se are secured by pivotal shafts 84 and 85, parallel to pivotal shafts 80 and 81, through closing plates 86 and 87 to the ends of supports 18 and 19 near frame beam 17 and to frame beam 17 itself. The rear unit (including radiator 86A) is supported at its front by support 87A by the supports 18 and 19 and near the side by a plate structure 88 arranged on supports 15 and 16 holding axle 6 associated with the differential gear concerned like axle 5 at a level above supports 15 and 16. Plate structure 88 comprises on its top side located above the differential of the rear unit two vertical, plate-shaped supports 89 and 90 located one on each side of the vertical plane of symmetry, to the top side of which supports is partly fastened a second tank 91.

The top surface of frame beam 17 has rigidly secured to it two parallel, upwardly extending and rearwardly inclined limbs 92 and 93 of a roller bracket 94 having approximately the shape of an inverted U, viewed in the direction of travel A. Roller bracket 94 comprises a horizontal tie beam 95 extending transversely of the longitudinal, vertical plane of symmetry of the rear unit and interconnecting the top ends of limbs 92 and 93. At two relatively spaced locations on tie beam 95, flexible connecting elements 96 and 97 are provided, to which cabin 10 is at least in part suspended. On the rear and bottom sides of cabin 10 further flexible connecting elements 98 are connected with the top side of tank 91. Tank 91 itself is fastened near its foremost boundary surface to limbs 92 and 93 of the roller bracket 94 by means of fastening elements 99. Tank 91 is located almost entirely above wheels 8, that is to say, primarily above the forward parts of wheels 8. On its top side tank 91 is bounded by a substantially horizontal surface at right angles to the vertical plane of symmetry of the rear unit terminating near the rear wall in an approximately vertical part, which may be provided with light fittings 100, while said vertical boundary surface is curved on the bottom side towards the front to form a lower boundary surface of tank 91, the shape of which matches the shape of wheels 8. The length of tank 91 is equal to the length of tank 71, measured transversely of the plane of symmetry of the forward unit so that the length of tank 91 measured at right angles to the plane of symmetry of the rear unit is approximately equal to the overall width of wheels 8. Tank 91 is arranged on the rear side of roller bracket 94. The vertical pivotal shaft including shaft 11 is located beneath the radiator 86A. At the front side of plate 76 are provided light fittings 147, for example, search lights and the like.

In supports 89 a pivotal shaft 101 is fastened so its center line is at right angles to the plane of symmetry of the rear unit; from seat 9 said pivotal shaft can be actuated by a hydraulic member (not shown). Near the two supports 89 and 90, pivotal shaft 101 has fastened to it two upper lifting arms 102 and 103 of a lifting device, with ends remote from the pivotal shaft 101 pivotally connected to lifting rods 104 and 105. The upper ends of lifting rods 104 and 105 are pivotally connected to lower lifting arms 106 and 107, which are in specular position relative to the vertical plane of symmetry of rear unit. Arms 106 and 107 extend away from respective pivotal bearings 108 and 109, formed actually by a horizontal shaft 110 transverse of the plane of symmetry, first formed by portions 111 and 112 respectively extending to the rear and parallel to the plane of symmetry of the rear unit over a portion still located, viewed from aside, inside the circumference of wheels 8, portions 111 and 112 being located near the inner side of wheels 8 nearest the vertical plane of symmetry. Portions 111 and 112 terminate at the rear in rearwardly extending and outwardly inclined portions 113 and 114, which are located, viewed from the side, beyond the circumference of wheels 8. Finally portions 113 and 114 terminate in end portions 115 and 116 respectively, extending parallel to the longitudinal, vertical plane of symmetry of the rear unit. Portions 111 and 112 have fastened rigidly to them tubings 117 and 118 respectively, which intimately fit around shaft 110. At the center shaft 110 has a shoulder 119 pivotably engaged by the proximal ends of tubings 117 and 118. Between the inner surfaces of portions 111 and 112 and associated tubings 117 and 118, respectively, triangular closing plates 120 and 121, respectively, are welded to stiffen connections between portions 111 and 112 and tubings 117 and 118 respectively. The end portions 115 and 116 have fastened to them pivotal shafts 122 and 123 respectively, the center lines of which are registering and at right angles to the plane of symmetry of the rear unit. Supporting members 124 and 125 can be fastened to detachable pivotal shafts 122 and 123 respectively. The shape of supporting members 124 and 125 is such that they engage the inner sides of portions 113, 115 and 114, 116 respectively of lower lifting arms 106 and 107 respectively. Supporting members 124 and 125 are rigidly connected with one another by two supporting members or plates 126 and 127, parts of the outer circumference of which join parts of the inner boundaries of supporting members 124 and 125 respectively. Plates 126 and 127 are rigidly secured to supporting members 124 and 125. Plates 126 and 127 are prolonged from the forward ends of supporting members 124 and 125 in the forward direction and are shaped so that, viewed in plan, the plates join with some amount of clearance the inner sides of portions 111 and 112 respectively of the lower lifting arms and moreover, viewed in plan, the rear boundary lines of tubings 117 and 118. The distance between parallel plates 126 and 127, which are parallel to a plane at right angles to the plane of symmetry of the rear unit, is such that plates 126 and 127 substantially completely embrace cover plates 120 and 121 on the top and bottom sides so the assembly of supporting members 124 and 125 and plates 126 and 127 cannot turn about the pivotal shafts 122 and 123, this being prevented by closing plates 120 and 121 fastened to the lower lifting arms. Between the plates 126 and 127 is a pivotable drawbar 128, which can be set in a plurality of positions and which is constructed from sheet material having a thickness corresponding with thickness of the closing plates 120 and 121. Drawbar 128 is pivotable by means of a vertical pivotal shaft 129 located, as mounted near shoulder 119 and which can be set in a plurality of positions by a pin 130 to be received through one of holes 131 in register in plates 126 and 127 and through an aligned hole in drawbar 128. The distance between the centers of holes 131 and the center of pivotal shaft 129 is, of course, the same for all holes. Pivotal shaft 129 can be removed from plates 126 and 127 so drawbar 128 may be utilized in a pivotal mode. Plates 126 and 127 have a rearwardly projecting bulging part near the plane of symmetry of the rear unit, viewed in plan, the shape of said bulging part, being such that parts of plates 126 and 127 associated with bulging part 132 are depressed downwardly and upwardly respectively so that between these depressed parts a space is provided for a draw hook or draw ring or like device to be drawn for insertion between plates 126 and 127 and to be fixed in place by a lock bolt, passed through overlying holes 133 in bulging part 132. The assembly of supporting members 124 and 125, plates 126 and 127 and drawbar 128 may, if desired, be removed by disengaging pivotal shafts 122 and 123 so lifting arms 106 and 107 may be employed for attaching a machine or a tool, should said assembly should hinder such use. The height of drawbar 128 and of the drawing device formed by plates 126 and 127 above the ground is smaller than the height of the center of gravity of the whole tractor above the ground, the first height being, moreover, smaller than half the wheel diameter of identical wheels 7 and 8.

Engine 3 has two exhaust pipes 134 and 135, which join sound absorbers 136 and 137 respectively. Viewed in the direction of travel A, exhaust pipes 134 and 135 are located on different sides of the longitudinal, vertical plane of symmetry of the forward unit, from which plane of symmetry they extend outwardly and, viewed in plan, in a rearwardly inclined position and in a side view, in an upwardly inclined position. Viewed in plan, the free ends of exhaust pipes are located near the two outermost, vertical boundary surfaces of the tractor and above two outermost wheels 7. In this way exhaust gases of the engine 3 are expelled in front of walls 138 so that they will not hinder the viewing field from the cabin to the ground immediately in front of wheels 7.

Tank 71 has at least two partitions 139 and 140 located one on each side of the longitudinal, vertical plane of symmetry of the forward unit and dividing the space of tank 71 in a liquid-tight manner into at least three compartments, each of which has fuel supply ports, vent holes, cleaning traps and the like. Tank 91 in a similar manner is divided into at least three compartments. Between tanks 71 and 91 connecting pipes or hoses are arranged so as to be elastic or movable in the areas of pivotal shafts 13 and 14 and including a fuel pump joined so that each compartment of each tank 71 and 91 can communicate with any other compartment of the same tank or of the other.

Supports 89 and the plate structure 88 are furthermore provided with two rearwardly projecting ears 141 and 142, which are rigidly secured to the frame of the rear unit. Ears 141 and 142 are connected with one another and have near their free ends fastening openings 143 and 144 for tools to be attached. Ears 141 and 142 are located at such a distance above arms 106 and 107 they do not hinder the pivotal movement of said lifting arms, whereas they can co-operate with fastening members 122 and 123 for the attachment of a machine or a tool.

The forward unit is adapted to turn about the vertical pivotal shaft 11 with respect to the rear unit through an angle of about 100° in total.

FIG. 11 illustrates a tractor of analogous structure, whih is supported by four front wheels 145 and four back wheels 146, the width of which exceeds that of the wheels in the first embodiment, while the distance between two adjacent wheels exceeds the distance between two adjacent wheels in FIGS. 1 to 10. The overall width of the tractor is approximately equal to that of the first embodiment. A tractor of this construction is particularly suitable for working on wet or marshy soil, since mud, ground water and the like can more readily escape between neighboring wheels.

In operation and under normal conditions the tractor is driven by engines 3 and 4, which separately drive wheels 7 and wheels 8 via the associated clutches, torque converters and differential gears. The actuating members near the seat may be detachably coupled, when engines 3 and 4 are operating. The tractor is particularly appropriate for work on large, even very large areas in remote regions. Under these conditions a tractor should have a very large radius of action, since the supply of fuel and the like involved considerably greater difficulties than working on fields near living centers. The capacity of fuel tanks and hence radius of activity are so great that very large fields can be worked without interruption by the machines or tools coupled with such a tractor, independently of the a refuelling station according to the invention high-capacity tanks 71 and 91 are disposed so that despite their high capacity, the driver has a good view of the ground in front of the front wheels, between the front wheels and the back wheels and also of the machine or the tools coupled at the rear. Viewed from the driver's seat 9, tank 71 of forward tractor unit is completely located within the viewing angle of wheels 7 or wheels 145. Viewed from the driver's seat tank 91 is also completely located within the viewing angle of the row of wheels 8 or wheels 146. This despite the high capacity of the tanks 71 and 91 the driver's view is not reduced, while the comparatively narrow structure obtained by disposing the engine units in sequence is conducive to this good view. From the standpoint of the operator's view, the width of driving units in tandem is narrower than with two engines arranged side by side or with one large engine unit of the same power. This also permits restricting the frame supporting the driving units to a smaller width.

Two separate engines which are mass-produced and associated component parts are, in general, cheaper than a single, very large engine unit of the same power which has to transfer exceptionally high forces and torques. In working large fields two separate engine units have the further advantage that, in the event of a failure of one of the engines, the other allows continuation of the work. A failure of a single, large engine unit results in the tractor with the attached machines or tools becoming inoperative on a remote field, which may be accessible only with difficulty and which may be at a large distance from workshops and the like so that local repairs or a transport of the tractor and the machines would be expensive operations.

The pivotable arrangement of the units, which are thus relatively pivotable about vertical pivotal shaft 11, provides a a comparatively simple construction which is appreciably cheaper than if parts of front axle 5 have to be steerable. Also a comparatively small turning circle is obtained. By means of a hydraulic fluid pump and the associated control-slides (not shown) the foremost tractor unit can be turned with respect to the hindmost tractor unit in travelling along curves, for example, by extending the piston rod of cylinder 32 and simultaneously drawing in the piston rod of cylinder 83 or conversely. The substantially horizontal pivotal shaft 12, located in the plane of symmetry of the forward unit, allows a horizontal turn of axle 5 with respect to axle 6 for travelling across uneven ground, which is important in view of the comparatively large width of wheels 7 and 8 or 145 and 146, respectively. To limit a turn of the forward unit with respect to the rear unit, part 36 is provided with the set of strips 41 and 42, the lower ends of which form stops, which come into contact with the associated contact surfaces of lug 43. In this way the forward and rear units turn about the center line 14 through an angle of 15° in one direction out of the central position and through an angle of 15° in the other direction, because in the direction of turn lug 43 may be considered stationary with respect to the rear unit. Since the front side of the rear unit is located above shaft 11, the compact construction requires the provision of a hollow part in the tank 71 bounded by the outer surface of supporting plate 72 and outer surfaces of the partitions 78 and 79 to avoid a contact with rear engine 4 when making curves and about center line 14.

The engine 3 and associated transmission components is located, primarily in front of axle 5, whereas other parts of the forward unit i.e. the tank 67, the tank 71 and the heavy, solid axles 11 and 12 and the asociated pivotal shaft structure are located, behind axle 5. The disposition and the weight of the tanks 67 and 71 and those of the solid shafts 11 and 12 and of the associated construction are such that the center of gravity of the forward unit is located on the side of axle 5 remote from engine 3 and hence behind said wheel axle. The location of the center of gravity remains on the same side even if tanks 67 and 71 are empty. This location of the center of gravity of the forward unit is of particular importance, when comparatively large and heavy machines or tools are attached to the lifting device at the rear side. Owing to said location of the center of gravity of the forward unit the vertical pivotal shaft structure including the shaft 11 is loaded by a downward, transverse force and a downward bending moment, which reduce or completely neutralize the great, upward bending moment, which would otherwise result from the heavy machines or tools attached to the lifting device. The same moment is, of course, also acting on horizontal shaft 12. With the construction according to the invention, the magnitude of forces in shafts 11 and 12 may also be acted upon by the distribution of the quantities of liquid in tanks 67 and 71 and tank 91 and the ratio between the weight on wheels 7 and 8 can thus be varied. Adaptation is also possible when, instead of machines or tools attached to the lifting device 102, 103, 106, 107, a drawn tool such as a plow is used, in which case the load of the shafts 11 and 12 appreciably changes because the force then exerted on the tractor results in different wheel and pivotal-shaft loads. When travelling through bends a torsional load is applied at least partly to the rear unit owing to the said location of the center of gravity of the forward unit and conversely, which load may, if necessary, be regulated with the aid of partitions 139 and 140, which permit distributing the load asymmetrically in the tanks so that even when transversing long bends, which frequently occur in agricultural operations, a favorable moment in the pivotal shafts is obtained.

With the disposition of tanks 67 and 71, viewed in plan, between axle 5 and the vertical pivotal shaft 11 in the direct proximity of axle 5, the full weight of said tanks with their contents, if any, increases the load on wheels 7 so that with this arrangement the engine 3 may exert a very high driving torque without the risk of skidding, while a very large contact surface with the ground involving a favorable wheel load is obtained by wheels 7 or wheels 145 whereby the maximum torque transfer is also high. In a similar manner the weight of fuel tank 91 and of the adjacent construction contributes to the load wheels 8 or wheels 146, which also have a large contact surface with a reasonable pressure. The great weight of an empty tank 71 is to a considerable extent due to the comparatively heavy girder plate 72 covering the whole width of the tractor.

It will be understood the invention is not limited to the written disclosure but also relates to the details of the Figures, whether described or not described.

Having thus described my invention, what I claim as new and desire to secure by Letters Patent of the United States is:

1. A tractor which comprises: a front portion and a rear portion; pivot means having a substantially vertical pivot axis connecting said portions in tandem whereby they are turnable about said pivot means within limits; and front portion including a front engine and a front axle with a plurality of front ground engaging wheels mounted on each side thereof; said rear portion including a rear engine, a rear axle with a plurality of rear ground engaging wheels mounted on each side thereof and coupling means for receiving agricultural implements; the length of said first portion from its front end to said axis, the length of said second portion from said axis to the rear end of said coupling means, and the distance between said axles all being substantially equal.

2. A tractor in accordance with claim 1, wherein said engines each include a drive shaft, said drive shaft being received in a vertical plane of symmetry of the tractor when said portions are in straight alignment, each of said drive shafts being inclined upwardly in a forward direction as seen in side elevation of approximately ten degrees relative to the horizontal when the tractor is supported on a level surface.

3. A tractor in accordance with claim 1, wherein the overall width of each of said portions is substantially equal to said distance.

4. A tractor in accordance with claim 1, wherein said portions are connected so as to be turnable within limits relative to each other about a substantially horizontal axis extending in the normal direction of travel of the tractor and being within a vertical plane containing said vertical axis and means being provided for controlling the relative position of said portions about said substantially vertical axis.

5. A tractor which comprises: a front portion and a rear portion; pivot means having a substantially vertical axis of rotation connecting said portions in tandem whereby they are turnable about said pivot means within limits; said front portion including a front engine and a front axle with a plurality of front ground engaging wheels mounted on each side thereof, said front engine extending substantially in front of said axle and having a drive shaft operatively connected to said front wheels, said rear portion including a rear engine and a rear axle with a plurality of rear ground engaging wheels mounted on each side thereof, said rear engine extending substantially in front of said rear axle and having a further drive shaft operatively connected to said rear wheels, said rear engine including a front part which is spaced above said pivot means; each of said drive shafts having its longitudinal axis substantially in the vertical plane of symmetry of the tractor when said portions are in straight alignment and being inclined upwardly in a forward direction when seen in side elevation of approximately about ten degrees relative to the horizontal when the tractor is supported on a level surface.

6. A tractor in accordance with claim 5, wherein said portions are connected so as to be turnable within limits relative to each other about a substantially horizontal axis contained in said plane of symmetry, and means being provided to control the relative position of said portions about said substantially vertical axis.

7. A tractor in accordance with claim 5, wherein said front portion includes a frame supporting said engine, a bottom of said frame forward of said wheels being inclined parallel to said drive shaft of said front engine.

* * * * *